Aug. 21, 1962  G. A. LYON  3,050,338
WHEEL COVER
Filed Sept. 9, 1957  2 Sheets-Sheet 1
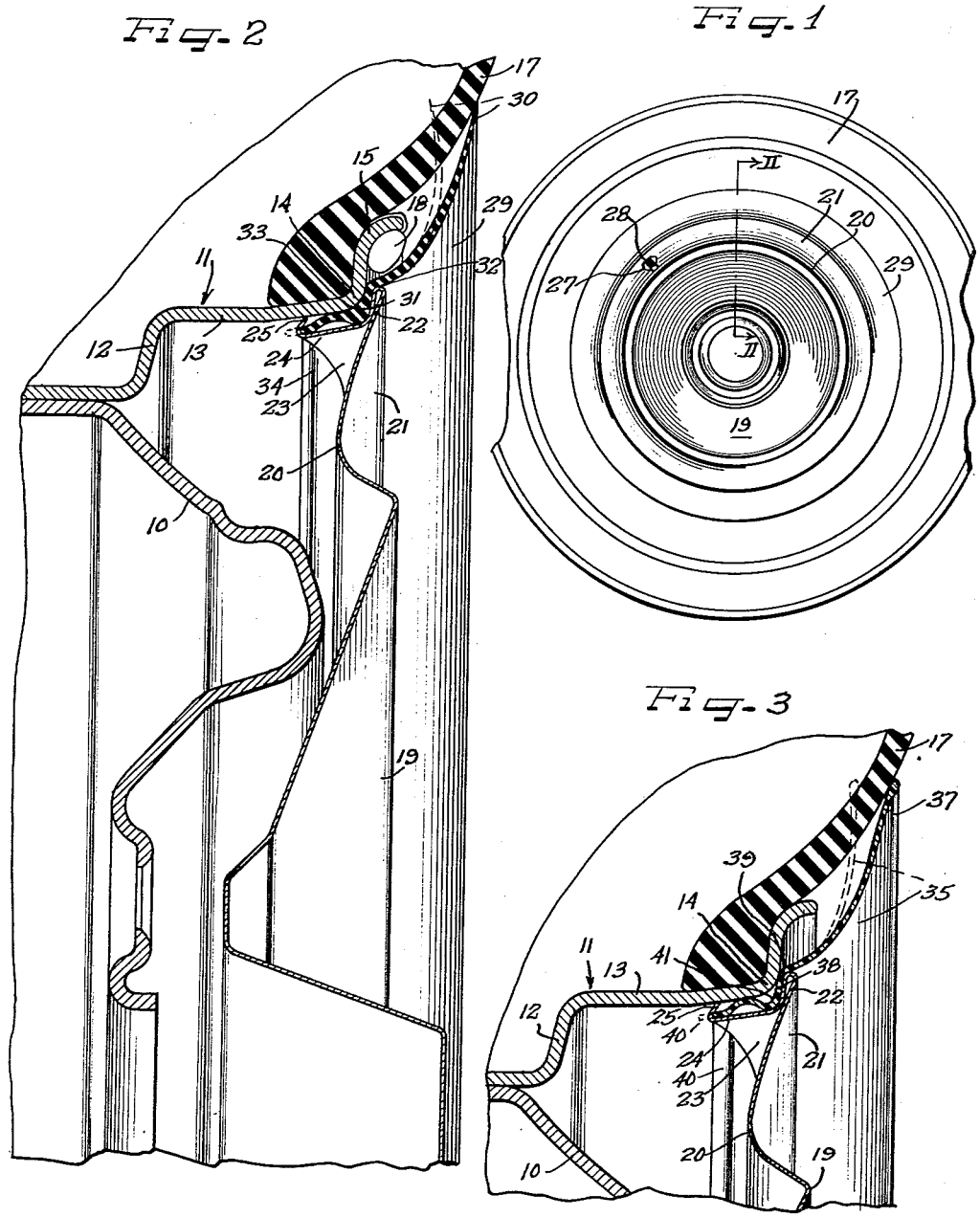
Inventor
GEORGE ALBERT LYON
by Hill, Sherman, Meroni, Gross + Simpson Attys.

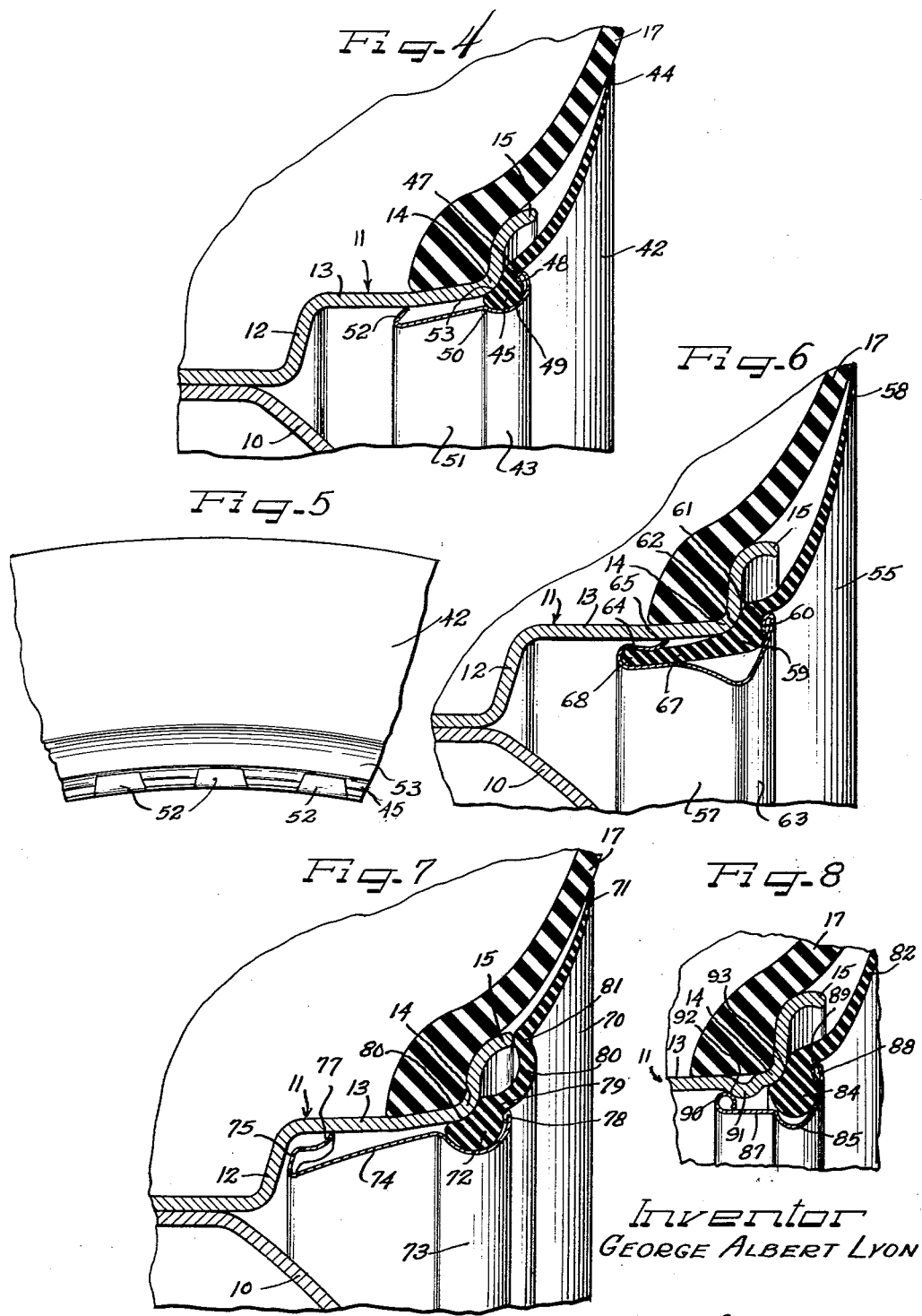

United States Patent Office 3,050,338
Patented Aug. 21, 1962

3,050,338
WHEEL COVER
George Albert Lyon, Detroit, Mich., assignor to Lyon Incorporated, Detroit, Mich., a corporation of Delaware
Filed Sept. 9, 1957, Ser. No. 682,692
4 Claims. (Cl. 301—37)

The present invention relates to improvements in wheel structures and more particularly concerns the provision of novel means for providing a wheel with a simulated white sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white sidewalls, generally resulting in a sacrifice of quality in the body of the tire including the tread and principal sidewall portions thereof.

To overcome the disadvantages of cure compromise, it has been proposed to secure the white sidewall portion or veneer to the sidewall of the tire after the tire has been vulcanized. Such after-attached sidewall members ar inherently liable to such disadvantages as peeling, and the like, and of course require a separate attaching or vulcanizing operation that raises costs.

It has also been heretofore proposed to provide separate simulated white sidewall ring members that are secured between the terminal flange of the tire rim and the bead portion of the tire and separably hug the sidewall of the tire. Such simulated or mock tire white sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated white sidewall rings is that, especially with tubeless tires there is interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing difficulties and disadvantages of the prior expendients and to provide a simulated tire white sidewall of improved appearance and which can be applied, or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member which is adapted for optional assembly with a wheel cover for disposition over the outer side of the wheel.

Yet another object of the invention is to provide a tire sidewall simulating flexible ring device which is adapted to be carried in clamped engagement with the outer side of a tire rim.

It is a further object of the invention to provide cushioning means for a wheel cover, also adapted for providing a simulated tire sidewall.

Other objects, features and advantages of the present invention will be readily apparent from the following detailed description of certain preferred embodiments thereof, taken in conjunction with the accompanying drawings in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a radial sectional detail view similar to FIGURE 2 but showing a modification;

FIGURE 4 is a similar radial sectional detail view showing another modification;

FIGURE 5 is a fragmentary rear elevational view of the trim ring and tire sidewall simulating device of FIGURE 4;

FIGURE 6 is a fragmentary radial sectional detail view through a wheel structure similar to FIGURE 2 but showing yet another modification;

FIGURE 7 is a similar radial sectional detail view showing still another modification, and FIGURE 8 is a fragmentary radial sectional view through a wheel structure showing a further modification.

Referring to FIGURES 1 and 2, and automobile wheel including a disk spider wheel body 10 supports a tire rim 11 including an outer side flange 12 from which extends a generally axially outwardly projecting annular intermediate flange 13 merging on a juncture shoulder 14 with a generally radially outwardly extending and axially outwardly turned terminal flange 15. A pnuematic tire 17 of preferably the tubeless type is carried by the tire rim. A wheel balancing weight 18 may be carried by the terminal flange 15.

For disposition at the outer side of the wheel and in covering relation to the wheel body 10, as well as substantially covering relation to the tire rim, there is provided a wheel cover 19 which is preferably of the self-retaining type generally embodying features as covered in my Patent No. 2,624,634 issued January 6, 1953. To this end, the cover 19 includes an intermediate annular dished portion 20 radially outwardly of which is a generally radially and axially outwardly projecting annular marginal portion 21 of a diameter to overlie the radially inner portion of the tire rim terminal flange 15 and especially the juncture 14 with the intermediate flange. An outer terminal underturned reinforcing and finishing flange 22 behind the cover margin leads into a generally axially inwardly extending cover retaining flange 23 of slightly smaller diameter than the axially outer portion of the tire rim intermediate flange 13 so as to be telescoped thereinto in the assembly. The flange 23 has a series of generally axially inwardly extending retaining fingers 24 provided with short and stiff generally radially and axially outwardly oblique terminals 25 retainingly engageable in gripping cover retaining relation with the intermediate flange under resilient tension of the retaining fingers 24 which are resiliently radially inwardly deflected from a normal diameter wherein the tips of the finger terminals 25 lie on a slightly larger diameter than the engaged portion of the intermediate flange 13 in the assembled relationship of the cover on the wheel.

The cover 19 is applied to the outer side of the wheel by registering a valve stem aperture 27 in the dished portion 20 with a valve stem 28 carried by the side flange 12 of the tire rim. Then by applying axially inward pressure on the cover 19, the annular series of retaining fingers 24 effect cover retaining in uniform engagement with the tire rim.

For affording the appearance of the tire 17 having a white sidewall, a ring member 29 is provided which preferably is made from a rubber-like material and for which a synthetic rubber such as butyl is especially desirable. Such synthetic rubber is characterized by especially desirable form sustaining resilient flexibility, good color qualities and excellent durometer control.

For affording tire sidewall simulating shape for the ring member 29, it is of generally axially outwardly curved transverse or radial shape terminating in a thin, and in this instance substantially feather edge radially outer extremity 30 engageable against the sidewall of the tire 17 with a fine line generally merging effect so that the ring member appears on the wheel as though it were an integral sidewall portion of the tire. The outside diameter of the ring member 29 at the tire engaging edge 30 thereof, is such that the edge 30 engages the tire sidewall on the incurve of the outer sidewall, with a substantial sidewall portion radially outwardly beyond the point of contact disposed in protective overlying relation to the sidewall ring member.

At its radially inner margin, the sidewall ring member 29 is provided with means for retaining interengagement with the wheel cover 19 and with the tire rim 11. To this end, the inner margin of the ring member 29 is constructed as an angular flange which is complementally received within the angular space or reentrant corner defined by the underturned and axial flange portions 22 and 23 behind the cover marginal portion 21. A generally radially inwardly projecting annular ring marginal flange portion 31 is formed generally complementary to the underturned cover marginal flange 22 and is internested therewith. At juncture of the flange portion 31 with the body of the ring member 29 is a neck portion on the axially outer side of which is provided a groove 32 opening generally axially outwardly and receptive of the edge extremity of the cover marginal portion 21 in internested relation, the body portion of the ring extending in outwardly convex curved relation from the groove, and in concave curved relation at the inner side of the ring from the generally axially inwardly directed rib provided at the juncture on the inner side of the ring. It will also be observed that the body portion of the ring 29 is in this instance of maximum thickness and thus form sustaining resilient stiffness at the juncture with the ring retaining flange 31, with the thickness of the body of the ring tapering progressively toward the outer marginal extremity or tip 30 of the ring.

In the present instance, the radially inwardly projecting marginal flange portion 31 of the sidewall simulating ring is in the form of a thick solid bead-like rib which is not only nestably conformed with the underturned cover marginal flange 22, but also is formed to fit into the reentrant juncture groove between the flange 22 and the flange portion 23 of the cover. In addition, the rib flange 31 is provided with a generally radially outwardly and axially inwardly opening annular groove 33 on its inner side generally complementary to and nestably seatingly engageable upon the tire rim shoulder 14. Through this arrangement, the ring flange rib 31 provides a cushion behind the cover margin and is interlocked between the cover margin and the tire rim shoulder 14 against pulling out from behind the cover margin, thereby anchoring the ring member 29 against pull-out displacement in service. It will be observed that the edge extremity or bead-like terminal portion of the cover margin 21 coacting with the neck-like juncture of the rib flange 31 with the body of the ring 29 and the underlying tire rim portion and more particularly the radially inner portion of the terminal flange 15 under the axially inward thrust of the cover edge as effected by gripping of the retaining fingers 24 through their terminals 25 with the intermediate flange 13, locks the substantially thicker radially inner rib portion of the rib flange 31 against escape through the relatively narrow gap between the cover edge and the tire rim. On the other hand, radially inward working of the ring member 29 is avoided by the internested, opposing relation of the edge of the cover groove 32 thereof, and the internested, shouldering interengagement of the radially inner portion of the bead flange 31 with the generally axially extending and thus radially outwardly facing cover retaining flange 23, as well as the grip upon the flange 31 effected between the cover marginal structure and the tire rim. In addition, of course, the rubber-like material of the ring member 29 has a high coefficient of friction which enables it to resist relative movement with respect to the gripping portions of the cover and wheel.

Retention of the ring member 29 on the cover 19 when the cover is off of the wheel, is provided for by a generally axially inwardly extending angular flange extension 34 from the radially inner portion of the rib flange 31 and of a length to fit at its axially inner extremity interlockingly with the retaining terminals 25 of the retaining fingers. More particularly, the flange extension 34 is preferably thinner than the dimension between the radially outer side of the retaining finger 24 and the tip of the retaining terminal flange 25 of the retaining finger in each instance. The flange 34 is also preferably slightly longer than the retaining fingers 24. In addition, of course, in view of the resilient deflectability of the rubber-like material of the ring member 29 and thus also reasonable elasticity, the retaining flange portion 34 is elastically flexibly manipulable snappingly and self-retainably into the axially outwardly opening retaining grooves afforded by the turned finger terminal flanges 25 at juncture thereof with the body portions of the retaining fingers 24. Initially the flange 34 may project more nearly straight from the rib flange portion 31, as indicated in dash outline in FIGURE 2, so that after assembly has been effected with the retaining terminal flanges 25, a cramped, resiliently longitudinally slightly compressed, radially outwardly arched or bowed condition of the flange 34 prevails substantially as shown in full line in FIGURE 2. As a result of this more or less longitudinally compressed condition of the retaining flange 34, it reacts to thrust in axially opposite directions to maintain its tip extremity in the finger terminal flange groove, and the finger rib flange 31 in engagement with the underturned cover marginal flange 22. Since the ring flange 31 is dimensioned to engage the axial cover flange 23 and is held by the retaining flange 34 in engagement with the underturned flange 22, effective unitary assembly with the cover 19 is provided for. Nevertheless, if desired the ring member 29 can be removed from the cover by elastically snapping it free by disassembly movement generally axially inwardly past the tips of the retaining finger terminals 25, by a reverse manipulation to that by which the ring member was elastically snapped into engaged relation with the cover.

In assembly of the sidewall simulating ring member 29 with the cover and the tire rim, the inner side of the ring member provides a chamber over the terminal flange 15 of the tire rim and affords clearance for one or more of the wheel balancing weights 18. During wheel balancing, it is not necessary to remove the cover 19 or the ring member 29 from the wheel, since due to its resiliently deflectability and elasticity, the ring member 29 can be easily bent back or open, about a fulcrum provided by the edge of the cover at the groove 32 of the ring member. When released from the bending back manipulation thereof, the ring member 29 promptly snaps back to its tire sidewall engaging relationship.

By preference, at least the radially outer portion the body of the ring member 29 is constructed to assume in the unassembled condition thereof with respect to the tire, a normal more axially inwardly deflected position, as indicated in dash outline in FIGURE 2. Then, when the ring 29 is associated with the tire 17, it is resiliently flexed and deflected to swing generally axially outwardly as it bottoms on and hugs the tire sidewall through the tip 30 under resilient tension. This assures that in all variations of inflation or service movements of the tire sidewall, effective flexible self-positioning contact of the ring tip 30 is maintained throughout the perimeter of the tire sidewall, thereby avoiding dirt entry gap or flapping or slipstream induced vibration. Material such as butyl synthetic rubber has a high memory and recovery factor.

In addition to other advantages mentioned for the sidewall simulating ring member 29, it affords a more massive appearance for the tire by hiding of the terminal flange 15 of the tire rim and seeming to increase the radially inward extent of the tire sidewall, in fact, making it appear that the inside diameter of the tire and the edge of the cover 19 coincide.

By the interposition of the resilient, elastic material of the ring member 29 between the margin of the cover and the tire rim, any tendency toward squeaking or rattle or drumming of the cover are prevented since the interposed portion of the ring member provides a cushion and a sound deadening or damping material.

Not only does the interposed inner marginal structure of the ring member 29 afford cushion for axially inwardly imposed pressures against the cover and more especially the marginal portion 21 thereof, but there is effective cushion provided by the inner rib portion of the ring member flange 31, and the axial flange 34 between the retaining flange 23 and the fingers 24 against diametrical displacement of the cover responsive to road shocks and the like or diametrical pressures exerted by curbing or the like against the outside of the cover. This is amply demonstrated by increased resistance to coming off of the covers in response to violent transverse or diametrical shocks, and especially observable in drop testing where the cover mounted on a wheel is dropped freely from a given height with weights attached to the center of the cover to provide mass and inertia tending to dislodge the cover. Apparently, the annular ring of cushioning material interposed by the inner marginal structure of the ring member 29 between the retaining flange structure of the cover and the opposed surface of the tire rim resiliently restrains the cover against transverse or diametrical movement in the direction of the dropping or road shock force and thereby avoids loosening of the retaining grip of the retaining finger terminals on the upper or opposite side of the wheel from the point of impact.

Inasmuch as the rubber-like material of the ring member 29 has a high coefficient of friction, and it is clamped over a substantial annular area of its inner and outer surfaces against respectively the tire rim and the cover, the ring member affords effective means to prevent turning or rotation of the cover relative to the wheel responsive to torque forces in service.

Although the tire sidewall simulating ring 29 may be colored white, in line with the popular demand for the dress-up or ornamental effect of white sidewalls on the tire, it will be appreciated that the ring may be provided with any other desired color as may be dictated from time to time by styling or user preferences, such as to distinguish various makes or models of automobiles and to harmonize with decorative design.

In removing the cover 19 from the wheel, the sidewall ring member 29 is bent back from its tensioned tire sidewall engaging position at the point where pry-off tool force is to be applied to the margin of the cover, and a pry-off tool such as a screwdriver is inserted behind the rib of the ring member behind the groove 32 and pry-off tool leverage applied axially outwardly thereon and thereby against the margin of the cover. In this connection it may be observed that the resilient, elastic material of the ring member interposed between the pry-off tool and the margin of the cover serves as a cushioning and protective member to aid in avoiding pry-off tool damage or denting of the cover margin.

In the modification of FIGURE 3, components of the wheel as well as the cover may be identical with those shown in FIGURES 1 and 2 and are therefore identified by identical reference numerals. However, in this form of the invention a sidewall ring member 35 is provided which is adapted to be made from a synthetic resin or plastic material such as polyvinyl chloride, or the like, which is inherently less flexibly elastic than the rubber-like material such as butyl synthetic rubber of which the ring 29 may be made. While, of course, the synthetic rubber material is, generically, a plastic material it more nearly resembles natural rubber in elasticity and coefficient of friction. The resinous plastic material of the ring member 35 may be a thermoplastic or a thermosetting resin but possessed of substantial resilient flexibility, especially in relatively thin section or sheet form.

In the present instance, the plastic ring member 35 is formed from a molded sheet material to provide an annular body of concave convex cross-section and of a width to afford the desired tire sidewall simulating form and shape, with the radially outer edge extremity preferably slightly thickened or beaded as at 37 for reinforcement and to lie huggingly and self-comformably under resilient tension against the incurving outer sidewall of the tire. The normal unattached form and position assumed by the body portion of the ring member 35 in at least the radially outer portion thereof is axially inwardly beyond the outer edge position thereof assumed in engagement with the tire sidewall in the assembly, so that there must be an axially outward resilient deflection of the radially outer portion of the ring as indicated from the dash outline to the full outline position in the assembly. This assures self-position tensioned hugging of the edge of the ring member against the tire sidewall.

At its radially inner portion, the ring member 35 may be constructed in at least its cover opposing contour substantially the same as the ring member 29. To this end, there is provided an angular marginal structure including a generally radially inwardly extending angular flange portion 38 dimensioned to be nestably engaged with and behind the underturned cover marginal flange 22, with the edge of the cover fitting into a generally axially outwardly opening groove 39 at juncture of the flange 38 with the body of the ring member and from which the ring member body arches to provide a chamber within which the terminal flange 15 of the tire rim and any possible wheel balancing weights are accommodated. Extending generally axially inwardly from the inner terminus of the ring member flange 38 is a retaining and cushioning generally axially inwardly extending flange portion 40 which preferably is normally slightly longer than the dimension between the underturned cover marginal flange 22 and the opposing groove at juncture of the retaining fingers 24 and the retaining finger terminal flanges 25 so that with the inner edge terminal of the flange 40 engaged within the finger terminal groove a cramped, resiliently buckled condition of the flange 40 is assumed wherein it reacts to maintain the ring flange 38 firmly against the cover flange 22 and the intermediate radially outwardly buckled portion of the flange 40 serves as a cushion opposing the adjacent surface of the intermediate flange 13 of the tire rim.

It will be observed that the radially inner portion of the ring member flange 38 at juncture with the axially extending flange portion provides a rib formation internested within the reentrant groove of the cover flanges 22 and 23 and by virtue of the clamping of the ring member within the groove 39 against the tire rim by the cover edge firmly resisting pulling out of the ring member from behind the cover margin in the assembly with the wheel. On the other hand, however, due to inherent resilient flexibility or elasticity in the flange portion 40, it is readily manipulable to snap the same into or out of engagement with the cover when the cover is off of the wheel. Thereby the ring member 35, similarly as the ring member 29, is adapted to comprise an optional attachment for the cover and is also adapted for ready replacement if desirable. It will be observed that behind the ring member flange 38 is provided a groove 41 that opens generally axially inwardly and radially outwardly and generally straddles the tire rim shoulder 14.

In the modification of FIGURES 4 and 5, the wheel and tire are substantially the same as in FIGURES 2 and 3 and are therefore identified by the same reference numerals. In this form, however, a tire sidewall simulating or extension ring member 42 is provided which is adapted to be applied to the outer side of the wheel in association with a retaining trim ring member 43 which is self-retainable on the outer side of the wheel by engagement with the tire rim 11. In a sense, of course, the trim ring member 43 is more or less equivalent to the retaining marginal structure of the cover member 19 of FIGURES 2 and 3, but without the cover disk or plate portion. Manufacturing wise, of course, the ring member 43 may be rolled from strip stock while the cover 19 is a drawn member made with die press equipment.

In general, the sidewall ring member 42 may be constructed similarly to and of similar material as the ring member 29 of FIGURES 1 and 2. That is, the ring member 42 may be made from a rubber-like material with a concave convex body which is thickest at its radially inner portion and tapers to a feather edge 44 at its radially outer extremity, with such edge and the adjacent radially outer portion of the ring body resiliently flexed under tension axially outwardly from a normal more axially inward disposition, whereby to maintain a self-positioning hugging contact with the opposing sidewall of the tire.

At its radially inner margin, the ring member 42 is provided with an angularly disposed generally radially inwardly projecting and axially outwardly humped annular rib flange formation 45 providing at juncture with the body of the ring member 42 a generally axially outwardly opening groove 47 within which a turned marginal extremity 48 of the retaining trim member 43 is arranged to seat retainingly and grippingly while the rib flange 45 is nestably engaged within a complementary groove 49 provided by a generally channel shaped formation of the axially outer portion of the ring member 43. In generally axially inwardly spaced relation to the turned marginal extremity 48 of the ring member an opposing sidewall ring member rib engaging shoulder 50 is provided at juncture with a generally axially inwardly extending flange 51 of a diameter to extend in adjacent spaced telescoped relation within the tire rim intermediate flange 13 for retaining gripping engagement of generally radially and axially outwardly extending oblique retaining finger terminals 52 with the opposing surface of the intermediate flange. Through this arrangement, when the trim member 43 is pressed axially inwardly to the fully seated relation of the inner marginal rib flange 45 of the sidewall ring member against the tire rim, such rib flange is clampingly retained between the overlying marginal portion 48 of the trim member and at least the shoulder 14 of the tire rim, with this shoulder fitting into a complementary groove 53 in the innerface of the inner marginal rib flange 45.

Assembly of the rib flange 45 of the sidewall ring member within the trim groove 49 is easily effected by snapping it resiliently thereinto while the two ring members are free from the wheel. In the assembly on the wheel, the rib flange 45 is locked by the trim edge 48 in cooperation with the tire rim against pulling out of the sidewall ring member.

In FIGURE 6 the modification provides a sidewall simulating ring member which in general respects both as to structure and material, as well as mode of coaction with the tire 17 is substantially the same as the ring member 29, but a retaining trim ring member 57 is employed to hold the ring member 55 in position on the wheel. At its radially outer extremity, the ring member 55 is provided with a tire sidewall engaging feather edge 58, while at its inner margin the ring member 55 is provided with a generally angular radially inwardly extending annular rib flange 59 arranged to seat behind an underturned overlying outer marginal extremity 60 of the retaining trim ring member 57. A groove 61 at juncture of the body of the ring member 55 with the rib flange 59 receives the turned margin 60 which thereby clamps the annular neck connecting the rib 59 with the body of the ring 55 against the underlying tire rim and more especially the rim shoulder 14. To accommodate the shoulder 14 and effect interlocked seating therewith, a groove 62 is provided on the inner side of the angular rib flange 59.

To accommodate the radially inner portion of the rib flange 59 freely, the ring member 57 is preferably provided with a generally radially inwardly bulged annular intermediate channel portion 63 providing a generally radially outwardly opening groove. From the axially inner side of the intermediate bulge or rib portion 63 of the retaining trim ring member, the body thereof extends generally axially inwardly as an annular flange for spaced adjacent telescopic disposition relative to the intermediate flange 13 of the tire rim, and with a plurality of generally radially outwardly and then axially outwardly turned cover retaining fingers 64 provided on the axially inner terminus of the ring member 57. Each of the fingers comprises generally a loop portion having on the axially outer extremity thereof a generally radially and axially outwardly turned angular retaining terminal 65 which is engageable in gripping retaining press-on, pry-off relation with the opposing inner surface of the intermediate flange 13 of the tire rim.

In the present instance, the ring member 55 is provided with a generally axially inwardly extending inner marginal flange portion 67 joined to the radially inner portion of the rib flange 59 and preferably seated against the radially outer face of the axially extending body of the retaining trim member 57 and with an annular inner extremity beaded terminal 68 engaged in gripped relation within the loops of the retaining fingers 64. Intermediately the fingers 64 interlockingly grip the ring flange 67 axially outwardly adjacent to the terminal bead 68, especially in the radially inwardly deflected resiliently tensioned condition of the retaining fingers 64 in engagement with the intermediate flange 13. In fact, there is a compression of the inner marginal portion of the ring flange 67 as the retaining fingers 64 are radially inwardly flexed and such compression affords a resilient stiffening back-up for the retaining fingers 64 to enhance retaining engagement of the terminals 65 with the rim flange. This enhanced gripping resilient tensioning of the fingers is progressive as the fingers are cammed axially inwardly along the generally axially inwardly and radially inwardly sloping surface of the intermediate flange 13. Through this arrangement, the sidewall ring member 55 is retainingly interlocked not only with the tire rim by the engagement of the intermediate rib flange 59 of the ring but also by the interlocking grip of the terminal bead 68 by the retaining fingers, whereby to afford substantial resistance to forces that might tend to pull the inner margin of the sidewall ring member from its clamped retained position against the tire rim.

In the form of the invention shown in FIGURE 7, a similar tire sidewall simulating ring member 70 is provided with a feather edge radially outer terminal 71 for self-positioning or adjustably tensionably hugging the sidewall of the tire 17, while a radially inner marginal angular annular rib flange 72 is engaged by an axially outer annular rib channel gripping portion 73 of a retaining trim ring member 74 comprising a generally axially extending flange that is telescopically received in adjacent spaced relation within the intermediate flange 13 of the tire rim and has on its axially inner extremity a suitable series of generally radially outwardly and then axially outwardly turned retaining fingers 75 provided with generally axially outwardly and radially outwardly turned tire rim flange gripping terminals 77.

At its axially outer extremity, the ring member 74 has a turned gripping and finishing extremity 78 which is engaged within a generally axially outwardly opening annular groove 79 at juncture of the sidewall ring member 72 with the body portion of the ring member and whereby the neck at such juncture is clamped against the tire rim shoulder 14 which is received in a groove 80 on the axially inner side of the rib flange portion 72.

In this instance, there is provided between the concave convex gradually thinning main body portion of the ring member 70 and the inner marginal retaining rib flange 72 a generally axially outwardly arched annular rib-like channel chamber portion 80 arranged to arch over the terminal flange 15 and afford wheel balancing weight clearance or chamber therewith, while an indented annular seating rib 81 at the radially outer side of the portion 80 is engageable with the tip of the terminal flange 15.

In FIGURE 8 a sidewall simulating ring 82 of generally similar construction and functioning is provided, having a feathered axially outer tire sidewall self-positioning and tensionably hugging edge, which may be similar to the edge 30 in FIG. 2, and a radially inner angularly disposed annular rib margin 84 engaged within a generally channel-shaped annular axially outer portion 85 of a retaining trim ring member 87. A turned outer edge extremity 88 of the ring member 87 engages within a generally axially outwardly opening annular groove 89 provided on the axially outer side of a neck portion of the ring member at juncture of the rib flange 84 and the body of the ring 82.

Retention of the ring member 87 on the outer side of the wheel is effected by means of a turned axially inner terminal edge bead 90 which is retainingly engageable with radially inwardly projecting retaining bumps 91 provided on the axially outer portion of the intermediate flange 13 of the tire rim. Through this arrangement, when the retaining ring 87 with the sidewall ring 82 assembled therewith is pressed axially inwardly, the retaining bead 90 is cammed over the retaining bumps 91 and snaps into retaining engagement with generally radially and axially inwardly facing retaining shoulders 92 on the respective bumps 91, of which there are a series disposed circumferentially spaced apart about the circumference of the intermediate flange. In the fully engaged condition of the ring 87 with the retaining bumps 91, the turned edge 88 of the ring member 87 grippingly thrusts the interposed neck portion of the ring member 82 at the groove 89 against the tire rim and effects firm seating of the rib 84 within an annular groove 93 on the inner side thereof against the tire rim shoulder 14. This coaction also maintains the retaining bead 90 in firm resiliently tensioned engagement with the retaining bump shoulders 92.

In all forms of the invention, the retaining means for the sidewall simulating ring members, whether in the form of a full cover or in the form of a trim ring, may be made from suitable ornamental metal sheet or strip, as the case may be, susceptible of receiving the desired finish, whether a painted finish or a polished and plated finish.

It will also be appreciated that the particular retaining means of the several forms of the invention are at least in most instances interchangeable.

It will be understood that modifications and variations may be effected without departing from the scope of the novel concepts of the present invention.

I claim as my invention:

1. In a wheel structure, a rim having an intermediate flange and a terminal flange and arranged to support a pneumatic tire having an outer sidewall, a cover member for disposition at the outer side of the wheel having a turned outer marginal portion for overlying the tire rim terminal flange and provided with generally axially inwardly extending cover retaining flange structure generally telescopically disposed in adjacent spaced relation to the intermediate flange and having axially inner terminal means retainingly engageable with the intermediate flange, and a non-metallic tire sidewall extension ring member of a diameter to overlie the tire sidewall adjacent to the rim terminal flange and also to overlie the terminal flange and having a portion thereof retainingly engaged between the turned outer marginal portion of the cover member and the tire rim and including an inner marginal cushion portion interposed in the space between the retaining flange structure of the cover member and the intermediate flange of the tire rim and serving as cushioning means to resist off-center deflection of the cover member under road shocks or other radial or diametrical forces tending to move the cover member diametrically relative to the wheel.

2. In a wheel structure including a multi-flanged tire rim having a radially inwardly facing intermediate flange and an annular rim shoulder disposed axially outwardly of said intermediate flange, a circular metallic cover member having an outer marginal portion confronting the annular rim shoulder and also having cover retaining structure on the axially inner side of the cover member cooperable with the intermediate rim flange to retain the cover in removable assembly on the wheel, and a radially outer non-metallic ring member overlying the tire rim radially outwardly of the outer marginal cover portion and projecting therebeyond into side wall-simulating relation to the side wall of a tire supported by the tire rim, said ring member having an inner marginal ring portion underlapping the outer marginal cover portion and with the outer marginal cover portion through the action of the retaining structure of the cover with said intermediate flange clamping the inner underlapping marginal ring portion against said annular rim shoulder and thereby sustaining the ring member in assembly on the wheel, the cover member having behind said outer marginal portion of the cover member axially spaced generally confronting shoulders between and by which the underlapping inner marginal ring portion is retainingly directly engaged to enable handling of the cover member and the ring member as a unitary assembly when the cover member and ring member are removed from the wheel.

3. A wheel structure as defined in claim 2, wherein said retaining structure of the cover member comprises a generally axially inwardly extending circumferentially spaced series of cover retaining fingers disposed at the axially inner side of said outer marginal portion of the cover member and each provided with a generally radially and axially outwardly projecting retaining terminal grippingly engageable with said intermediate flange and providing one of said confronting shoulders, and said underlapping inner marginal ring portion including a generally axially extending flange having its axially inner terminus engaged within the retaining finger terminal shoulder.

4. In a wheel structure including a tire rim having intermediate and terminal flanges joined on a juncture shoulder, with a pneumatic tire engageable in the tire rim, a combination trim and tire rim sidewall simulating assembly including a non-metallic circular member having a radially outer tire sidewall simulating portion which extends generally radially and axially inwardly from its outermost extremity into overlying relation to the terminal flange, said non-metallic member having an annular seating portion arranged to bottom against said rim shoulder, and metallic means for engaging and retaining the circular member in assembly on the wheel including a plurality of retaining fingers projecting generally axially inwardly from the non-metallic member radially inwardly adjacent to said seating portion and retainingly engageable with the intermediate flange of the tire rim and holdingly engaging a portion of the non-metallic member which is axially inwardly offset from said seating portion and with a generally axially inwardly projecting annular flange portion of the non-metallic member interposed between the fingers and the tire rim intermediate flange.

References Cited in the file of this patent

UNITED STATES PATENTS

| | | |
|---|---|---|
| 2,016,251 | Lyon | Oct. 1, 1935 |
| 2,265,241 | Lyon | Dec. 9, 1941 |
| 2,607,633 | Lyon | Aug. 19, 1952 |
| 2,618,513 | Horn | Nov. 18, 1952 |
| 2,624,634 | Lyon | Jan. 6, 1953 |
| 2,749,186 | Wood | June 5, 1956 |
| 2,757,972 | Lyon | Aug. 7, 1956 |
| 2,757,985 | Lyon | Aug. 7, 1956 |
| 2,819,119 | Perrin | Jan. 7, 1958 |

FOREIGN PATENTS

| | | |
|---|---|---|
| 1,061,278 | France | Nov. 25, 1953 |
| 61,528 | France | Nov. 24, 1954 |

(First addition to 1,015,295)